US007025036B2

(12) United States Patent
Lampard

(10) Patent No.: US 7,025,036 B2
(45) Date of Patent: Apr. 11, 2006

(54) VALVE CONTROLLED DIVIDED CHAMBER INTERNAL COMBUSTION ENGINE

(75) Inventor: Robert Douglas Lampard, Canningvale (AU)

(73) Assignee: Barrack Combustion Process Pty, Ltd., Fremantle (AU)

( * ) Notice: Subject to any disclaimer, the term of this patent is extended or adjusted under 35 U.S.C. 154(b) by 0 days.

(21) Appl. No.: 10/496,641

(22) PCT Filed: Nov. 25, 2002

(86) PCT No.: PCT/AU02/01365

§ 371 (c)(1),
(2), (4) Date: Sep. 23, 2004

(87) PCT Pub. No.: WO03/046345

PCT Pub. Date: Jun. 5, 2003

(65) Prior Publication Data

US 2005/0016495 A1  Jan. 27, 2005

(30) Foreign Application Priority Data

Nov. 29, 2001 (AU) .................................. PR9193

(51) Int. Cl.
F02B 19/02 (2006.01)
F02B 19/12 (2006.01)

(52) U.S. Cl. ............... 123/261; 123/269; 123/288; 123/292

(58) Field of Classification Search ................ 123/255, 123/261, 269, 275, 288, 292
See application file for complete search history.

(56) References Cited

U.S. PATENT DOCUMENTS 4,248,192 A * 2/1981 Lampard .................... 123/292
4,641,616 A * 2/1987 Lampard .................... 123/292

* cited by examiner

Primary Examiner—Tony M. Argenbright
(74) Attorney, Agent, or Firm—Neifeld IP Law, P.C.

(57) ABSTRACT

An engine has a plurality of combustion chambers, each of which is divided into an ignition chamber and a first combustion chamber. The chambers are linked by a transfer tube defining a passageway facilitating communication between the ignition chamber and the first chamber. A valve is provided for selectively opening and closing the passage. A tube is provided with an opening intermediate of its length allowing fuel to be injected via a fuel injector into the passage.

31 Claims, 4 Drawing Sheets

VALVE CONTROLLED DIVIDED CHAMBER INTERNAL COMBUSTION ENGINE

FIELD OF THE INVENTION

The present invention relates to a valve controlled divided chamber internal combustion engine, and an associated method for operating the same.

BACKGROUND OF THE INVENTION

In general terms, a valve controlled divided chamber internal combustion engine is an internal combustion engine having one or more combustion chambers where each combustion chamber is in effect divided into a first combustion chamber and an ignition chamber. The first combustion chamber and the ignition chamber communicate with each other via a passage which is selectively opened and closed by a valve.

In such known valve controlled divided chamber internal combustion engines, two separate fuel injectors are required, namely one for injecting fuel directly into the first combustion chamber and a second for injecting fuel directly into the ignition chamber. The engine is operated so that initially fuel is injected into the ignition chamber and ignited by a spark while the valve is closed, blocking fluid communication between the first combustion chamber and the ignition chamber. As a result of the valve being closed, combustion pressure within the ignition chamber rises rapidly. As a piston within a cylinder defining the first combustion chamber reaches top dead centre, the valve is opened allowing combustion products (which may be considered as a plasma) to flow through a passage to the first combustion chamber. Fuel is injected into the first combustion chamber and suitably timed to travel in conjunction with the plasma as it enters the first combustion chamber providing enhanced mixing, vaporisation and subsequent combustion of the injected fuel. This type of engine facilitates the practical use of relatively low-grade fuels and results in thermal and mechanical efficiencies which are superior to those of traditional diesel methods.

The present invention is a further development of the valve controlled divided chamber internal combustion engine.

SUMMARY OF THE INVENTION

According to the present invention there is provided a valve controlled internal combustion engine including:
  a cavity;
  a body moveable within said cavity, said cavity and moveable body together defining a first combustion chamber;
  an ignition cell defining an ignition chamber and provided with a transfer tube extending from said ignition chamber to said first combustion chamber, said transfer tube communicating via a first opening at one end with said ignition chamber, communicating via a second opening at an opposite end with said first combustion chamber, and provided with a third opening intermediate said first and second openings;
  a fuel injector disposed to inject fuel into said transfer tube through said third opening;
  a valve moveable between a first position where said valve provides a high impedance to fluid flow through said first opening and a second position where said valve provides substantially unimpeded fluid flow through said first opening; and,
  ignition means for igniting a fuel/air mixture in said ignition chamber.

Preferably said second opening includes a jet or orifice.

Preferably said jet orifice is one of a plurality of jet orifices.

Preferably said fuel injector injects a first volume of fuel and a second volume of fuel into said transfer tube at different times during a compression stroke of said body.

Preferably during a first phase of a compression stoke of said body said valve is moved to said second position and said injector injects said first volume of fuel whereby said first volume of fuel together with air present in said cylinder flows through said transfer tube into said ignition chamber.

Preferably during a subsequent second phase of said compression stroke during and after injection of said second volume of fuel said valve is moved to said first position.

Preferably during a subsequent third phase of said compression stroke said ignition means is operated to ignite said fuel in said ignition chamber to produce an ignited fuel/air mixture.

Preferably during a subsequent fourth phase of said compression stroke said valve is moved to said second position whereby said ignited fuel/air mixture together with said second volume of fuel is injected into said first combustion chamber via said transfer tube.

Preferably said engine includes an air gap surrounding at least a length of said transfer tube.

Preferably said ignited fuel/air mixture is ejected from said transfer tube through said second opening at a sonic speed.

Preferably when the body is a reciprocating piston (ie the engine is a reciprocating piston engine) said first phase of said compression stroke is from commencement of said compression stroke up to 25° before top dead centre.

Preferably said second phase of said compression stroke is between 25° to 15° before top dead centre.

Preferably said third phase of said compression stroke is between 15° before top dead centre to just prior to top dead centre.

Preferably said fourth phase of said compression stroke is at approximately top dead centre.

Preferably said piston has a head and said first combustion chamber includes a recess formed in said piston head.

Preferably said transfer tube extends into said recess when said piston is at top dead centre.

Preferably said recess is shaped, and said transfer tube is positioned so that ignited fuel/air mixture emanating from said second opening is divided into two flows which rotate in opposite directions.

According to the present invention there is provided a method of operating en engine having a first combustion chamber defined in part by a moving body retained in a cavity, an ignition chamber, a transfer tube providing fluid communication between said first combustion chamber and said ignition chamber, a fuel injector for injecting fuel into said transfer tube, a spark plug arranged to produce a spark for igniting fuel in said ignition chamber, and a valve moveable between a first position where said valve provides a high impedance to fluid flow between said ignition chamber and said combustion chamber, and a second position where said valve provides substantially unimpeded fluid flow between said first combustion chamber and said ignition chamber, said method including the steps of:
  during a first phase of a compression stroke of said body, placing said valve in said second position and operating said fuel injector to inject a first volume of fuel into said transfer tube whereby said fuel together with air in said first combustion dumber is forced into said ignition chamber by action of said body.

Preferably said method includes the step of:

during a subsequent second phase of said compression stroke, moving said valve to said first position and operating said fuel injector to inject a second volume of fuel into said transfer tube.

Preferably said method includes the step of:

during a third phase of said compression stroke, causing said spark plug to generate a spark for igniting said fuel and air within said ignition chamber to create an ignited fuel/air mixture.

Preferably said method includes the step of:

during a fourth phase of said compression stroke, moving said valve to said second position whereby said ignited fuel/air mixture is injected into said transfer tube to mix with said second volume of fuel and subsequently sweep said second volume of fuel into said first combustion chamber.

BRIEF DESCRIPTION OF THE DRAWINGS

An embodiment of the present invention will now be described by way of example only with reference to the accompanying drawings in which.

DETAILED DESCRIPTION OF PREFERRED EMBODIMENTS

Figure 1:
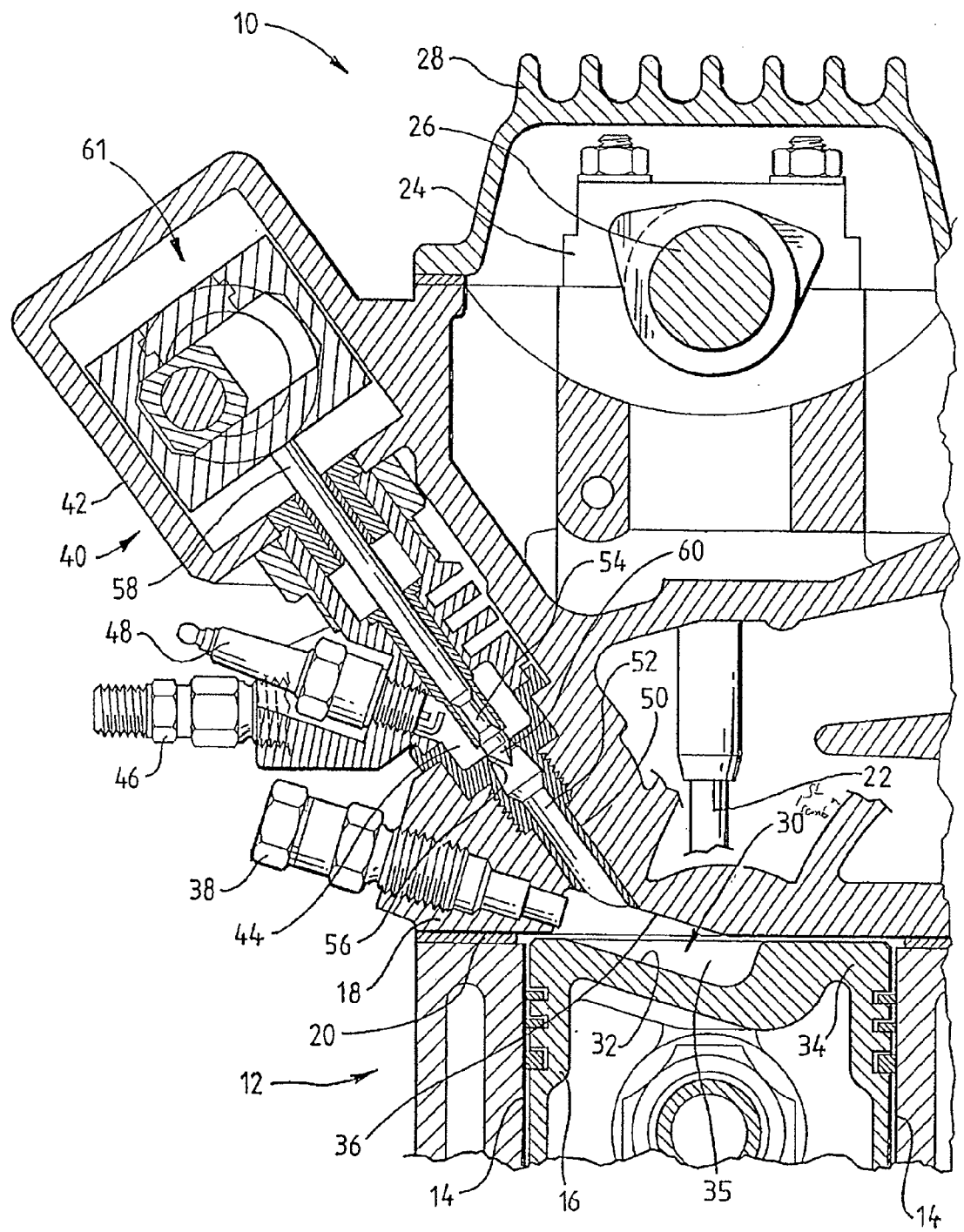
FIG. 1 is a schematic representation of a prior art valve controlled divided chamber internal combustion engine.

FIG. 1 depicts schematically a prior art valve controlled divided chamber internal combustion engine 10. Engine 10 includes an engine block 12 which is machined to define a plurality of cavities in the form of cylinders 14 (only one shown) each of which houses a moveable body in the form of a reciprocating piston 16. A cylinder head 18 is bolted to the block 12 with a gasket 20 disposed between in order to provide a seal in a conventional manner. The head 18 provides communication with exhaust and intake manifolds as well as housing conventional inlet and exhaust valves 22, a rocker assembly 24 and camshaft 26. The rocker assembly 24 is closed by rocker cover 28.

A first or main combustion chamber 30 is formed in engine 10 between an upper surface 32 of the crown 34 of piston 16 which is provided with a recess or depression 35 and an upper part of the cylinder 14 bound by a facing surface 36 of the head 18. A fuel injector 38 is screwed into the head 18 in a conventional manner to direct a spray of fuel into the first combustion chamber 30.

An ignition cell 40 is coupled to the head 18 and acts to provide an ignition source for the fuel injected by the injector 38. The ignition cell 40 includes a housing 42 which defines an ignition chamber 44. A further fuel injector 46 and a spark plug 48 are received by and coupled to the housing 42 for delivering fuel and ignition spark respectively to the ignition chamber 44. A the 50 extends from the ignition chamber 44 and provides a passageway 52 which facilitates fluid communication between the first combustion chamber 30 and the ignition chamber 44.

A valve 54 within the housing 42 selectively opens and closes a throat 56 of passageway 52 adjacent the ignition chamber 44. The valve 54 includes a valve stem 58 having a head 60 at a distal end which is shaped essentially complementary to the shape of the throat 56 and moveable between the first position where it provides a high impedance to the flow of fluid through the throat 56 and a second retracted position where it allows a substantially unimpeded flow of fluid through the throat 56. The valve stem 58 is driven by a scotch yoke drive 61.

Engine 10 operates as follows. Following commencement of the compression stroke of the piston 16, the valve 54 is in its second position where it allows the flow of air being compressed by the upward movement of the piston 16 to flow through the passage 52 and t 56 into the ignition chamber 44. At about 25° before top dead centre (TDC) the valve 54 is closed limiting any further substantive increase in air pressure within the ignition chamber 44. The timing of the closing of valve 54 results in a compression level within the ignition cell 44 of approximately between 8:1 and 10:1. This would be less than the maximum compression in the first combustion chamber 30 which would typically be in the order of 14:1 to 15:1.

Fuel is then injected via the injector 46 into the ignition chamber 44. The fuel is vaporised by the compression heat and mixed with air within the chamber 44 to form a homogeneous fuel/air mix that it is typically relatively rich in fuel but well within the reliable spark ignition mixture range. Such a rich mixture enhances the ignition qualities of the resulting ignition cell combustion products (which may be considered as a plasma) and injected to enhance the combustion occurring in the fit chamber 30.

During a next phase or stage of the compression cycle, the spark plug 48 is operated to produce a spark to cause combustion of the fuel/air mixture within the ignition chamber 44. As a result of the combustion, the pressure within the ignition chamber 44 rapidly rises to exceed the maximum pressure within the first combustion chamber 30 when the piston 16 is at TDC.

At or just prior to TDC, the injector 38 injects a volume of fuel into the first combustion chamber 30. The valve 54 is also moved to its second (opened) position to provide substantially unimpeded fluid communication between the ignition chamber 44 and the passage 52. As a result of the pressure differential the ignited fuel/air mixture from the ignition chamber 44 flows through the throat 56 and passage 52 into the first combustion chamber 30 where it vaporises, mixes with, and causes combustion of the fuel injected into the, chamber 30 via the fuel injector 38.

Figure 2:
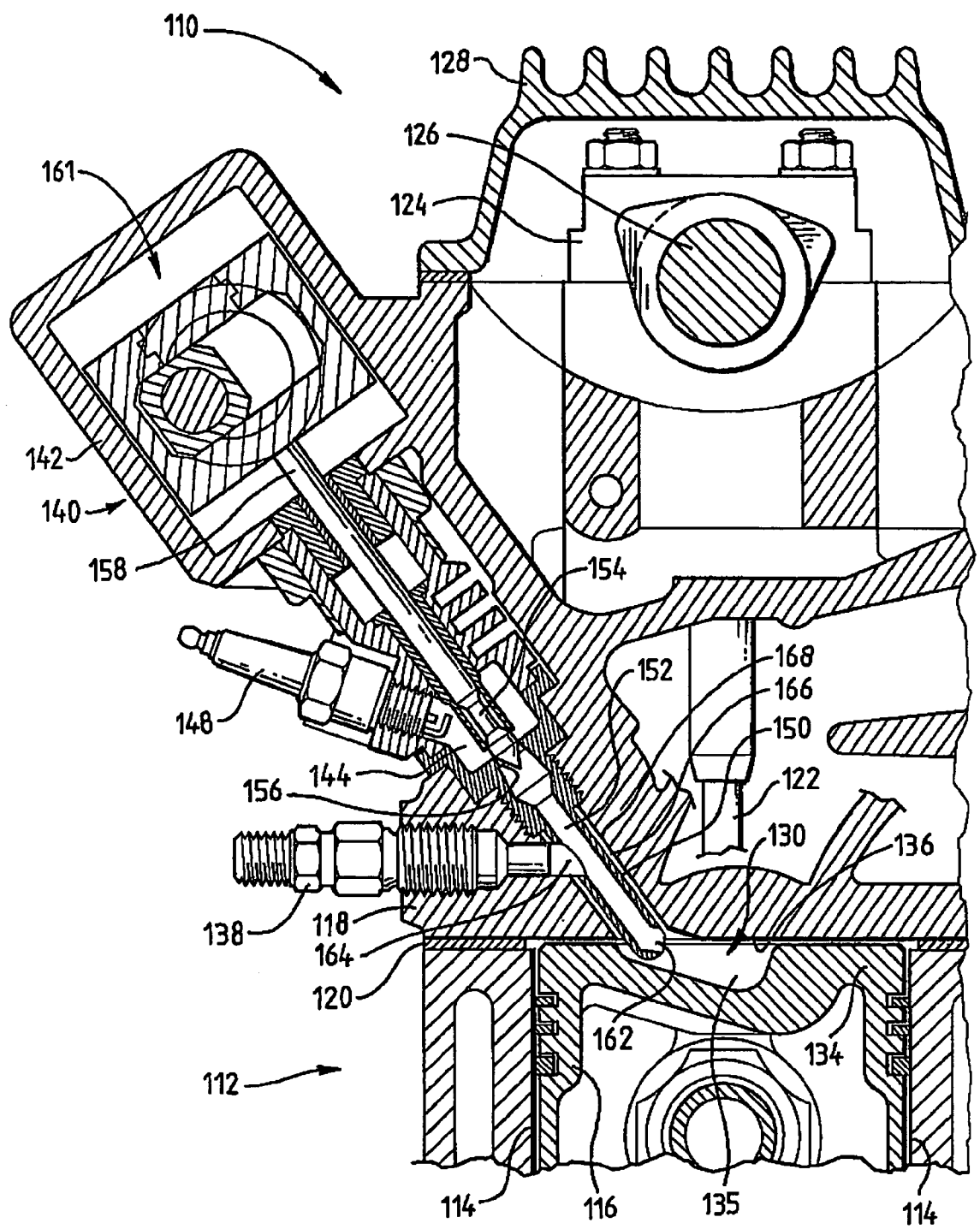
FIG. 2 is a schematic representation of an embodiment of a valve controlled divided chamber internal combustion engine.

An embodiment of the present invention is depicted in FIG. 2 in which the reference numbers used to describe the prior art embodiment shown in FIG. 1 with the inclusion of a preceding number one (1), are used to denote the same or similar features.

An embodiment of the valve controlled divided chamber internal combustion engine 110 in accordance with the present invention includes many components which arm the same or quite similar to those of the first embodiment including the engine block 112, cylinder 114, piston 116, head 118, gasket 120, valves 122, rocker assembly 124, camshaft 126 and rocker cover 128. The differences between the present embodiment of the engine 110 and the prior art engine 10 can be summarised as follows.

In the present embodiment 110 requires only one fuel injector 138. The fuel injector 138 is mounted in the head 118 but at different orientation in comparison with the prior art In the present embodiment of the engine 110, the injector 138 is mounted so as to direct the fuel into the passageway 152 at a location intermediate the length of the tube 150. As described in greater detail below, the injector 138 is operated twice during the compression stroke to provide fuel to the ignition chamber 114 and the first combustion chamber 130. As in the prior art the piston 116 of engine 110 is provided with a recess 135 in its crown 134. The tube 150 of the ignition cell 140 extends beyond surface 136 of the head 118 so as to partly extend into the recess 135 when the piston 116 is at top dead centre. With the throat 156 of the passage 52 being considered as a first opting of the tube 150, a second opening 162 is formed at a distal end of the tube 150 opening into the recess 135. The second opening 162 is shaped or otherwise configured as a jet orifice. A third opening 164 is formed in the tube 150 intermediate the first and second openings 156, 162 and juxtaposed relative to the injector 138 so that fuel injected via the injector 138 enters the passageway 152 through the opening 164. It will also be seen that there is an air gap 166 between an outside surface of a lower length of the tube 150 and a hole 168 in the head 118 through which the tube 150 extends. The purpose of the air gap 168 is to thermally isolate the passage 152 from the normal cooling jacket/cooling system of the engine 110. The surface 136 of the head 118 in the region of the tube 150 is also substantially flatter that the surface 36 in the prior art engine 10.

As with the prior art engine 10, the valve 154 in this embodiment is driven by a scotch yoke drive 161.

The operation of the engine 111 will now be described.

It will be appreciated that prior to the commencement of its compression stroke, the piston 116 would have been moving through an induction stroke drawing fresh air into the cylinder 116 for use during the next power stroke. As the compression stroke of the piston 116 commences, the air previously inducted into the cylinder 116 is compressed. During an initial phase of the compression stroke, the valve 154 is moved to its second (or opened) position where the valve head 160 is spaced from the throat 156 allowing fluid communication between the first combustion chamber 130 and the ignition chamber 144. Due to the upward motion of the piston 116, compressed air is forced up the passageway 152 into the ignition chamber 144. During this phase, a first volume of fuel, typically a third of the fuel volume that would generally be required to maintain engine idle with the same cubic capacity conventional gasoline engine, is injected into the tube 150 via the opening 164. This fuel is effectively swept into the ignition chamber 144 by the compressed air flowing into the ignition chamber 144.

During a second subsequent phase of the compression stroke of the piston 114, typically commencing at about 25° before top dead centre (BTDC) the valve 154 is moved to its first (or closed) position where it moves into the throat 156 providing high impedance to the flow of fluid through the throat 156. The head 160 of the valve 154 and the throat 156 are relatively configured, and the valve 154 operated so that it does not physically contact the throat 156 or other parts of the tube 150 when in the first or closed position. By closing the valve 154 at about 25° BTDC the compression ratio within the ignition channel 144 is typically between 8:1 and 10:1. However the timing of the closure of the valve 154 can be varied to control the compression ratio within the ignition chamber 144.

Also during this second phase of the compression stroke, the fuel injector 138 is again operated to inject a second volume of fuel into the passageway 152 via the opening 166 in the tube 150. Due to the motion of the piston 166, and the valve 154 being in its second or closed position, the second volume of fuel is by and large held within the passage 152. Due to the existence of the air gap 166 the tube 150 would generally be hotter than the surrounding head 118 as it is now thermally isolated by the air gap from the conventional cooling jacket/system. This additional heat assists in vaporising the second volume of injected fuel. The vaporising process is further assisted by the intermixing of hot compressed air being injected into the passageway 152 as the piston 116 moves towards TDC. This forms a very fuel rich mixture within the passage 152.

It will further be appreciated that up to TDC the rich fuel vapour within the passage 152 will be continually fed with highly heated compressed air entering through the angled jet orifice 162.

During a subsequent third phase of the compression stroke of piston 116, typically starting at around 15° BTDC the spark plug 148 is operated to produce a spark to commence combustion of the fuel/air mixture within the ignition chamber 144. As the fuel/air mixture is combusting, the pressure within the ignition chamber 144 rises rapidly and would typically greatly exceed the maximum compression ratio in the first ignition chamber 130 when the piston 116 is at TDC.

During a subsequent fourth phase of the compression stroke, typically at or just before TDC the valve 154 is very rapidly moved to its second (ie, open) position and back to the closed position Consequently, the ignited fuel/air mixture from the ignition chamber 144 exits the throat 156 at high velocity and flows into the passageway 152. Due to the relatively small volume of the passageway 152 and the amount of fuel present, the resulting mixture will be very rich and outside the explosive range. The combustion products from the ignition chamber 144 will combine intimately with the fuel vapour in the passageway 152, subsequently raising the temperature to a level well above the self-ignition point of all naturally occurring liquid hydrocarbon fuels. Accordingly the fuel injected into the passageway 152 commences combustion thereby forming a richer secondary plasma which subsequently flows at a sonic velocity through the jet orifice 162 into the main combustion chamber where it mixes with oxygen in order to complete the combustion process. Notwithstanding that the plasma enters the combustion chamber 130 at a sonic velocity, the oxygenation of the plasma will require a period of time, thus avoiding uncontrolled heat release and creating sound combustion.

The process of providing a burning plasma at sonic velocity into the first combustion chamber 130 is known as Sonic Plasma Enhanced Combustion (SPEC). The incorporation of this process provides the ability to start the main combustion in the first combustion chamber 130 at TDC and to perform fast but controlled combustion, and is at the same time less sensitive, as combustion pressure rise now occurs in the main combustion chamber which is staring to expand rapidly in a sympathetic manner as the piston 116 commences its power stroke.

The size of the jet orifice 162 may be used to control transfer of plasma from the passageway 152 into the first combustion chamber 130 thereby providing a mechanism for controlling the rate of combustion within the chamber 130. At lower pressure, gas flow volume through an orifice is near proportional to any increase in pressure. However, once gas pressure reaches about 147 psi sonic velocity is reached, this brings into play the characteristics of sonic turbulent flow at the orifice. Once this turbulence occurs it forms a flow restriction, such that in order to increase the flow volume in unit time, it requires very substantial pressure levels way beyond that obtainable by such combustion method in order to bypass the effects of the restricting turbulent flow across the orifice.

Consequently, this characteristic forms an ideal method of controlling the volume level that can be passed in unit time by a given orifice diameter. The selected size orifice flow volume remains unaffected by pressure levels once above approximately 147 psi. This method of control over the rate at which the plasma enters the first combustion chamber 130 dictates the availability of the plasma's rich fuel load, and hence the rate of the fuel's heat release when combining with the compressed air in combustion chamber 130.

Thus the main combustion rate can be controlled in a relatively simple way by using the volume of flow and a suitable design of the orifice or orifices to reach this objective. Sonic velocity equates to a speed of approximately 330 mm per millisecond.

This speed is near ideal as it is fast and affords simple methods to either speed up or slow down the combustion process.

The combustion proms within the first combustion chamber 130 may also be controlled or effected to some extent by the configuration of the recess 135 in the piston crown 134.

Figure 3:
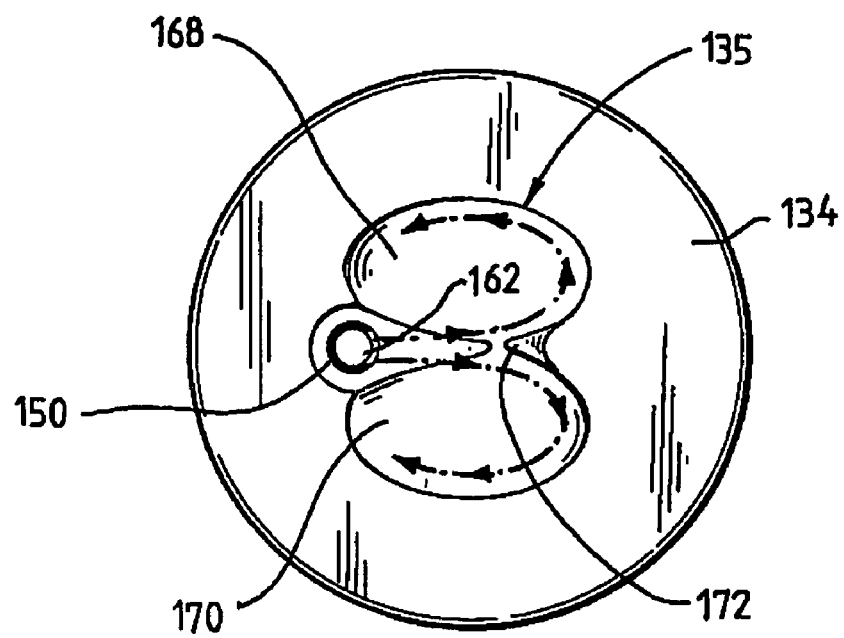
FIG. 3 is a plan view of a crown of a piston incorporated in the embodiment depicted in FIG. 2.

As depicted in FIG. 3, the recess 135 maybe formed into two sub-recesses or cavities 168 and 170 which are separated by a dividing ridge 172 extending from the crown 134 to divide the plasma stream ejected from the orifice 162 into two separate counter-rotating vortexes king a supply of oxygen for combustion Such action creates a fat but controlled combustion as the fuel-rich plasma will take a finite time to seek out its required quota of oxygen in order to complete combustion. The plasma vortexes are also augmented by squish at the flat piston face as the air is driven inwards due to its entrapment and as the piston 116 approaches the cylinder head surface 132. However, this squish action may be used in a more beneficial way by making the squish action area more uniform and the combustion chamber configured to complement the production of the squish turbulence.

Figure 4:
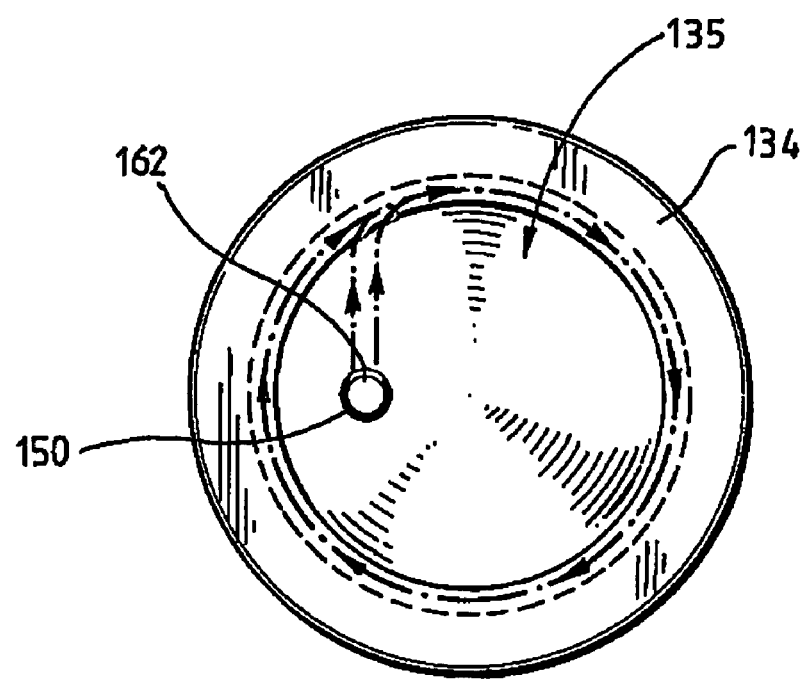
FIG. 4 is a plan view of the crown of an alternate embodiment of a piston incorporated in an embodiment of the present invention.

FIG. 4 illustrates an alternate configuration of the tube 152, piston crown 134 and recess 135. In this embodiment, the recess 135 is essentially a single circular depression in the crown 134 and the tube 150 or more particularly at least the jet orifice 162 is positioned so as to direct plasma parallel to a diameter of the piston crown but offset from the piston centre. This creates a plasma swirl or vortex in one direction only in the combustion chamber 130. This will have the effect of reducing the combustion speed, however, due to the one direction the turbulence pattern life will be extended and consequently may provide improved air utilisation.

Figure 5A:
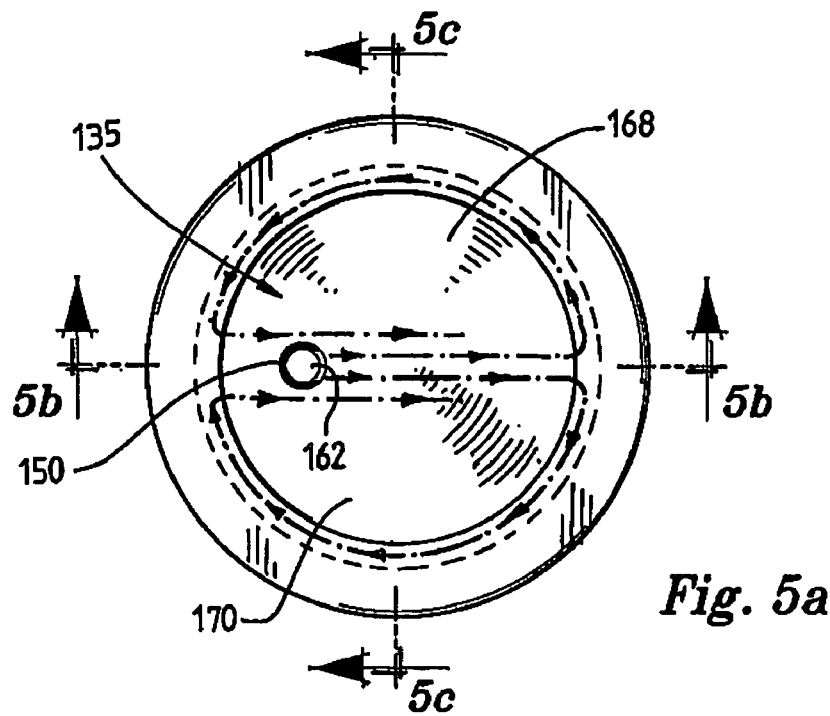
FIG. 5A is a plan view of the crown of a further alternate piston incorporated in the engine.
Figure 5B:
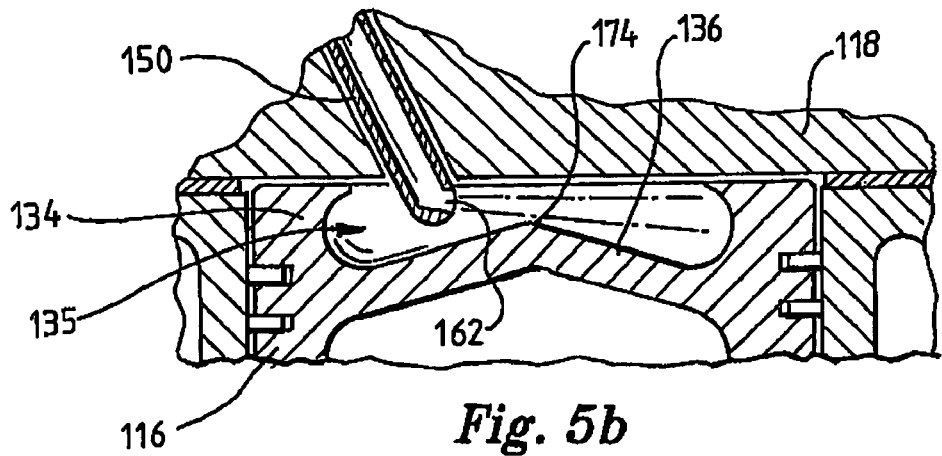
FIG. 5B is a view of section A of the crown shown in FIG. 5A.
Figure 5C:
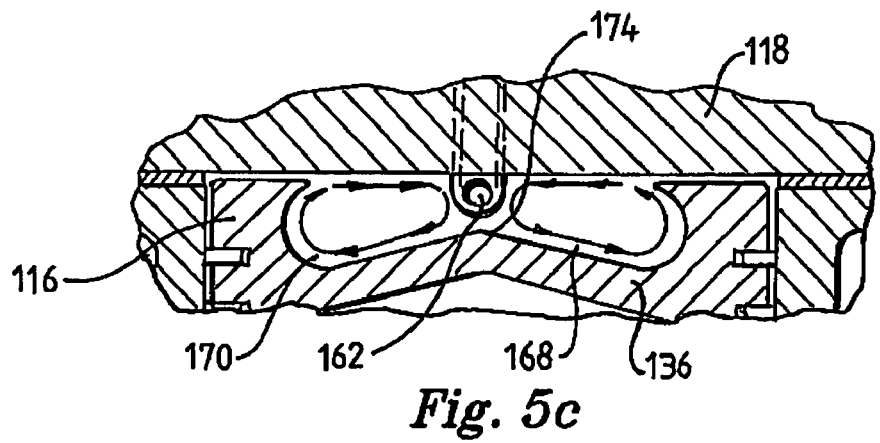
FIG. 5C is a view of section B of the crown shown in FIG. 5A.

FIGS. 5A–5C illustrate yet a further configuration of the piston crown 134 and recesses 135. Here, the jet orifice 162 is aligned along a diameter of the piston crown 134 and offset from the centre of the crown. The recess 135 is again divided into sub-cavities 168 and 170 to produce two counter-rotating plasma vortices. The surface 136 of the crown 134 in the recess 135 has a conical type profile with an apex 174 of the conical profile being raised relative to the base so that it forms the closest point of the surface 136 within the recess 135 to the cylinder head 118. This profile of piston crown produces doughnut-shaped turbulence patterns that intersect the plasma stream as it circulates the outer rim of the combustion chamber 130. This air mixing action enhances the combustion process and its rate automatically as engine speed is increased, and provides sound level of air utilisation.

It is believed that the above embodiments of the present invention may provide the following benefits and enhancements over the prior art Requires only one fuel injector for each engine cylinder reducing cost and improving reliability When only small fuel volumes are passed through a fuel injector as in the prior art depicted in FIG. 1, it does not have as sound a self-cleaning or cooling action as present injector 138 which also handles the full load fuel volumes.

By injecting the ignition cell fuel into the thermally insulated tube 150, improved vaporisation and mixture preparation is obtained for the ignition cell.

Injection of the fuel into the ignition cell air supply will take full advantage of the fuel's latent heat of evaporation, thus providing improved cooling to the control valve.

This technology suits the use of modern electronically controlled common rail high pressure fuel supply systems, using piezo or magneto restrictive controlled fuel injectors.

Current electronically controlled fuel supply systems can be used with this single CAV micro injector approach, as the individual pumps both incorporate one way fuel delivery valves that will allow twin deliveries into a common pipe.

This method allows earlier introduction and preparation of the main fuel volume in the transfer tube 150/passage 152 without any risk of fuel being able to gain early entry into the main combustion chamber 130.

By confining the main fuel as a conditioned vapor in the insulated tube 150/passage 152, if the main fuel volume is at a minimum or minimum volume, this entrapped fuel cannot avoid the thermal and pressure energy of the ignition cells sonic plasma The fuel in the passage must exit via the passage jet orifice 162 which is subjected to sonic turbulent flow characteristics, consequently if under start up conditions some fuel was not fully vaporized, the jet's turbulent flow will break-up any remain fuel down to a very fine level.

This main fuel preparation method is simpler and of much lower cost, than cut direct fuel injection methods aimed at tiny droplet size by using ultra high pressure fuel injection systems.

Sonic Plasma Enhanced Combustion (SPEC) reduces the fuel down to a molecular level and also heats it above its self ignition point, this is achieved prior to its high velocity introduction into the main combustion chamber air volume.

With the fuel super heated and divided into its individual molecules, it is in its optimum form to rapidly and completely combine and combust with the airborne oxygen The SPEC plasma methods main combustion process is not dependent on flame propagation, or sensitive to the mixture strength.

The fuel composition and characteristics have little influence in achieving sound combustion, as such factors are completely overridden by the mass transport at sonic speed of the fuel rich plasma.

The fuel rich burning plasma cannot combust in an uncontrolled manner as its fuel molecules must seek out the required oxygen molecules in the main chamber 130 to allow further combustion, this action to combine with the main chamber oxygen while very fast, it takes a predetermined time.

The main chamber combustion rate is also controllable by the jet orifices dimensions, number and orientation.

SPEC process provides a multitude of unique solutions to a wide range of previously unsolvable emission problems relating to NOx, CO and HC.

The main cause of particulate emissions in current engines is fuel droplets not finding adequate oxygen. The SPEC process eliminates the main instigator by ensuring no droplets are involved.

Due to the fuel versatility and preference for light end type fuels exhibited by SPEC its wide spread introduction, would not effect current petrol engine fuel distribution or usage patterns.

SPEC can also operate on current fuels until cheaper wide cut low specification fuels are made generally available.

Using SPEC over the road fuel economy will be significantly improved, while the high processing costs for current strict specification fuels can be avoided.

As previously mentioned, a substantial benefit in an embodiment of the present invention is the ability to allow an engine to operate on secondary fuels (low grade) as well as LNG and LPG. This arises due to the conditioning of the main volume of the fuel combusted during any power stroke. This arises due to a combination of factors including the pre-ignition of a smaller volume of fuel in the ignition cell which provides a plasma source for igniting the main volume of fuel; the holding of the main volume of fuel within the tube 150 for vaporisation, and the SPEC process.

Now that an embodiment of the invention has been described in detail it will be apparent to those skilled in the relevant arts that numerous modifications and variations may be made without departing from the basic inventive concepts. For example, the valve 154 is described and illustrated as being driven by a scotch yoke drive. However any other type of drive mechanism including electronically controlled mechanisms may be used. In addition, the transfer tube 150 is depicted as being provided with a single jet orifice 162. However two or more jet orifices can be provided. Also, while the preferred embodiment is described in relation to a reciprocating piston engine, embodiments may be applied to other types of combustion engines such as rotary (eg Wankel) engines. In such embodiments, the cavity is in the form of the engine housing and the moveable body is in the form of a rotor, rather than a cylinder and piston, respectively. Further, when applied to a rotary engine the ting described with reference to phases of the compression stroke of the piston will need to be converted to a corresponding rotor angular position.

All such modifications and variations together with others that would be apparent to those skilled in the relevant arts are deemed to be within the scope of the present invention the nature of which is to be determined from the above description and the appended claims.

The claims defining the invention are as follows:

1. A valve controlled internal combustion engine including:
   a cavity;
   a body moveable within said cavity, said cavity and moveable body together defining a first combustion chamber;
   an ignition cell defining an ignition chamber and provided with a transfer tube extending from said ignition chamber to said first combustion chamber, said transfer tube communicating via a first opening at one end with said ignition chamber, communicating via a second opening at an opposite end with said first combustion chamber, and provided with a third opening intermediate said first and second openings;
   a fuel injector disposed to inject fuel into said transfer tube through said third opening;
   a valve moveable between a first position where said valve provides a high impedance to fluid flow through said first opening and a second position where said valve provides substantially unimpeded fluid flow through said first opening; and,
   an igniter designed to ignite a fuel/air mixture in said ignition chamber.

2. The engine according to claim 1 wherein, said second opening includes a jet orifice.

3. The engine according to claim 2 wherein said jet orifice is one of a plurality of jet orifices.

4. The engine according to claim 3 wherein said fuel injector injects a first volume of fuel and a second volume of fuel into said transfer tube at different times during a compression stroke of said body.

5. The engine according to claim 4 wherein during a first phase of a compression stroke of said body said valve is moved to said second position and said injector injects said first volume of fuel whereby said first volume of fuel together with air present in said cavity flows through said transfer tube into said ignition chamber.

6. The engine according to claim 5 wherein during a subsequent second phase of said compression stroke during and after injection of said second volume of fuel said valve is moved to said first position.

7. The engine according to claim 6 wherein during a subsequent third phase of said compression stroke said igniter is operated to ignite said fuel in said ignition chamber to produce an ignited fuel/air mixture.

8. The engine according to claim 7 wherein during a subsequent fourth phase of said compression stroke said valve is moved to said second position and thereafter returned to said first position, whereby said ignited fuel/air mixture together with said second volume of fuel is injected into said first combustion chamber via said transfer tube.

9. The engine according to claim 1 including an air gap surrounding at least a length of said transfer tube.

10. The engine according to claim 9 wherein said ignited fuel/air mixture is ejected from said transfer tube through said second opening at a sonic speed.

11. The engine according to claim 8 wherein when said body is a reciprocating piston, said first phase of said compression stroke is from commencement of said compression stroke up to 25° before top dead centre.

12. The engine according to claim 11 wherein when said body is a reciprocating piston, said second phase of said compression stroke is between 25° to 15° before top dead centre.

13. The engine according to claim 12 wherein when said body is a reciprocating piston, said third phase of said compression stroke is between 15° before top dead centre to or just prior to top dead centre.

14. The engine according to claim 13 wherein when said body is a reciprocating piston, said fourth phase of said compression stroke is at approximately top dead centre.

15. The engine according to claim 14 wherein when said body is a reciprocating piston, said piston has a head and said first combustion chamber includes a recess formed in said piston head.

16. The engine according to claim 15 wherein said transfer tube extends into said recess when said piston is at top dead centre.

17. The engine according to claim 14 wherein said recess is shaped, and said transfer tube is positioned so that ignited fuel/air mixture emanating from said second opening is divided into two flows which rotate in opposite directions.

18. A method of operating an engine having a first combustion chamber defined in part by a moving body retained in a cavity, an ignition chamber, a transfer tube providing fluid communication between said first combustion chamber and said ignition chamber, a fuel injector for injecting fuel into said transfer tube, a spark plug arranged to produce a spark for igniting fuel in said ignition chamber, and a valve moveable between a first position where said valve provides a high impedance to fluid flow between said ignition chamber and said combustion chamber, and a second position where said valve provides substantially unimpeded fluid flow between said first combustion chamber and said ignition chamber, said method including the steps of:
    during a first phase of a compression stroke of said body, placing said valve in said second position and operating said fuel injector to inject a first volume of fuel into said transfer tube whereby said fuel together with air in said first combustion chamber is forced into said ignition chamber by action of said body.

19. The method of claim 18 wherein during a subsequent second phase of said compression stroke, moving said valve to said first position and operating said fuel injector to inject a second volume of fuel into said transfer tube.

20. The method of claim 19 wherein during a third phase of said compression stroke, causing said spark plug to generate a spark for igniting said fuel and air within said ignition chamber to create an ignited fuel/air mixture.

21. The method of claim 20 wherein during a fourth phase of said compression stroke, moving said valve to said second position whereby said ignited fuel/air mixture is injected into said transfer tube to mix with said second volume of fuel and subsequently sweep said second volume of fuel into said first combustion chamber.

22. An ignition cell for an internal combustion engine having a cavity, a body moveable within said cavity, said cavity and moveable body together defining a first combustion chamber, and a fuel injector for injecting fuel for combustion in said engine, said ignition cell including:
    a housing attachable to said internal combustion engine and defining an ignition chamber;
    a transfer tube extending from said ignition chamber to said first combustion chamber, said transfer tube communicating via a first opening at one end with said ignition chamber, communicating via a second opening at an opposite end with said first combustion chamber, and provided with a third opening intermediate said first and second openings and disposed to receive said fuel injected by said fuel injector; and,
    a valve moveable between a first position where said valve provides a high impedance to fluid flow through said first opening and a second position where said valve provides substantially unimpeded fluid flow through said first opening; and, an igniter supported by said housing and designed to ignite a fuel/air mixture in said ignition chamber.

23. The ignition cell according to claim 22 wherein said second opening includes a jet orifice.

24. The ignition cell according to claim 23 wherein during a first phase of a compression stroke of said body, said valve is moved to said second position and said injector injects a first volume of fuel whereby said first volume of fuel together with air present in said cavity flows through said transfer tube into said ignition chamber.

25. The ignition cell according to claim 24, wherein during a subsequent second phase of said compression stroke during and after injection of a second volume of fuel by said fuel injector into said third opening, said valve is moved to said first position.

26. The ignition cell according to claim 25 wherein during a subsequent third phase of said compression stroke said igniter is operated to ignite said fuel in said ignition chamber to produce an ignited fuel/air mixture.

27. The ignition cell according to claim 26 wherein during a subsequent fourth phase of said compression stroke said valve is moved to said second position thereafter returned to said first position whereby said ignited fuel/air mixture together with said second volume of fuel is injected into said first combustion chamber via said transfer tube.

28. A valve controlled internal combustion engine comprising:
    a cavity;
    a body moveable within said cavity, said cavity and moveable body together defining a first combustion chamber;
    an ignition cell defining an ignition chamber and provided with a transfer tube having a first end and an axially opposite second end, the transfer tube extending from said ignition chamber to said first combustion chamber, said transfer tube communicating via the first opening with said ignition chamber, communicating via the second opening with said first combustion chamber, and provided with a third opening intermediate said first and second openings;
    a fuel injector disposed to inject fuel into said transfer tube through said third opening;
    a valve moveable between a first position where said valve provides a high impedance to fluid flow through said first opening and a second position where said valve provides substantially unimpeded fluid flow through said first opening; and,
    an igniter designed to ignite a fuel/air mixture in said ignition chamber.

29. An ignition cell for an internal combustion engine having a cavity, a body moveable within said cavity, said cavity and moveable body together defining a first combustion chamber, and a fuel injector for injecting fuel for combustion in said engine, said ignition cell comprising:
    a housing attachable to said internal combustion engine and defining an ignition chamber;
    a transfer tube having a first end and an axially opposite second end, the transfer tube extending from said ignition chamber to said first combustion chamber, said transfer tube communicating via the first opening with said ignition chamber, communicating via the second opening with said first combustion chamber, and provided with a third opening intermediate said first and second openings and disposed to receive said fuel injected by said fuel injector; and, a valve moveable between a first position where said valve provides a high impedance to fluid flow through said first opening and a second position where said valve provides substantially unimpeded fluid flow through said first opening; and, an igniter, supported by said housing, and designed to ignite a fuel/air mixture in said ignition chamber.

30. A method of making a valve controlled internal combustion engine comprising:

providing a cavity;

providing a body moveable within said cavity, said cavity and moveable body together defining a first combustion chamber;

providing an ignition cell defining an ignition chamber and provided with a transfer tube extending from said ignition chamber to said first combustion chamber, said transfer tube communicating via a first opening at one end with said ignition chamber, communicating via a second opening at an opposite end with said first combustion chamber, and provided with a third opening intermediate said first and second openings;

providing a fuel injector disposed to inject fuel into said transfer tube through said third opening;

providing a valve moveable between a first position where said valve provides a high impedance to fluid flow through said first opening and a second position where said valve provides substantially unimpeded fluid flow through said first opening; and, providing an igniter designed to ignite a fuel/air mixture in said ignition chamber.

31. A method of making an ignition cell for an internal combustion engine having a cavity, a body moveable within said cavity, said cavity and moveable body together defining a first combustion chamber, and a fuel injector for injecting fuel for combustion in said engine, said method comprising:

providing a housing attachable to said internal combustion engine and defining an ignition chamber;

providing a transfer tube extending from said ignition chamber to said first combustion chamber, said transfer tube communicating via a first opening at one end with said ignition chamber, communicating via a second opening at an opposite end with said first combustion chamber, and provided with a third opening intermediate said first and second openings and disposed to receive said fuel injected by said fuel injector; and, providing a valve moveable between a first position where said valve provides a high impedance to fluid flow through said first opening and a second position where said valve provides substantially unimpeded fluid flow through said first opening; and, an igniter, supported by said housing, and designed to ignite a fuel/air mixture in said ignition chamber.

* * * * *